(12) United States Patent
Shah et al.

(10) Patent No.: US 10,977,236 B2
(45) Date of Patent: Apr. 13, 2021

(54) DYNAMIC RECOMMENDATION METHODS AND SYSTEMS FOR DATABASE CHANGES

(71) Applicant: salesforce.com, inc., San Francisco, CA (US)

(72) Inventors: Vatsal Shah, Hayward, CA (US); Anthony Desportes, San Francisco, CA (US); Kapildev Reddy Gowru, San Francisco, CA (US); Tigran Abovyan, North Bergen, NJ (US); Eric Alexander Hurlimann Perret, San Francisco, CA (US); Kayvaan Ghassemieh, San Francisco, CA (US); Ravi L. Honakere, San Ramon, CA (US)

(73) Assignee: salesforce.com, inc., San Francisco, CA (US)

( * ) Notice: Subject to any disclaimer, the term of this patent is extended or adjusted under 35 U.S.C. 154(b) by 290 days.

(21) Appl. No.: 15/477,440

(22) Filed: Apr. 3, 2017

(65) Prior Publication Data
US 2018/0285406 A1 Oct. 4, 2018

(51) Int. Cl.
*G06F 16/23* (2019.01)
*G06F 16/21* (2019.01)
*G06Q 10/06* (2012.01)
*G06Q 10/10* (2012.01)

(52) U.S. Cl.
CPC .......... *G06F 16/2358* (2019.01); *G06F 16/21* (2019.01); *G06Q 10/0631* (2013.01); *G06Q 10/063112* (2013.01); *G06Q 10/063114* (2013.01); *G06Q 10/063116* (2013.01); *G06Q 10/1095* (2013.01)

(58) Field of Classification Search
CPC .. G06F 16/2358; G06F 16/21; G06Q 10/1095
USPC ........................................................ 707/625
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |

(Continued)

OTHER PUBLICATIONS

Smith et al., Recognizing and Using Goals in Event Management, CHI 2009 (Year: 2009).*

(Continued)

*Primary Examiner* — Brittany N Allen
(74) *Attorney, Agent, or Firm* — LKGlobal | Lorenz & Kopf, LLP

(57) ABSTRACT

Computing systems, database systems, and related methods are provided for suggesting logical relationships between database objects. One exemplary method involves a server identifying a database action with respect to a contact object associated with an event object, and in response to the action, identifying a second contact object in the database likely to be related to the event object based on one or more attributes of the event object. The server provides an indication of the second contact object in association with the event object on a client device and updates the database to maintain an association between the event object and the second contact object in response to an input at the client device.

9 Claims, 7 Drawing Sheets

(56) References Cited

U.S. PATENT DOCUMENTS

| | | |
|---|---|---|
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,658,882 B1 * | 5/2017 | Fullmer ............... G06F 9/4881 |
| 9,754,243 B2 * | 9/2017 | Goldsmith ............ G06Q 10/06 |
| 2001/0044791 A1 | 11/2001 | Richter et al. |
| 2002/0072951 A1 | 6/2002 | Lee et al. |
| 2002/0082892 A1 * | 6/2002 | Raffel ................. G06Q 10/063 |
| | | 705/7.26 |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0061087 A1 * | 3/2003 | Srimuang ........ G06Q 10/06314 |
| | | 705/7.18 |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0217073 A1 * | 11/2003 | Walther ............... G06Q 10/109 |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2007/0112800 A1 * | 5/2007 | Seidl ..................... G06Q 30/02 |
| 2008/0167937 A1 * | 7/2008 | Coughlin ........... G06Q 10/1095 |
| | | 705/7.16 |
| 2008/0249972 A1 | 10/2008 | Dillon |
| 2009/0063414 A1 | 3/2009 | White et al. |
| 2009/0077570 A1 * | 3/2009 | Oral ................... G06Q 10/1093 |
| | | 719/318 |
| 2009/0100342 A1 | 4/2009 | Jakobson |
| 2009/0164259 A1 * | 6/2009 | Mizrachi ............... G06Q 10/02 |
| | | 705/5 |
| 2009/0177744 A1 | 7/2009 | Marlow et al. |
| 2010/0088143 A1 * | 4/2010 | Platt .................... G06Q 10/109 |
| | | 705/7.18 |
| 2010/0174575 A1 * | 7/2010 | Farrell ............ G06Q 10/063116 |
| | | 705/7.19 |

(56) References Cited

U.S. PATENT DOCUMENTS

| | | | |
|---|---|---|---|
| 2010/0180211 A1* | 7/2010 | Boyd | G06Q 10/10 715/751 |
| 2011/0054978 A1* | 3/2011 | Mohil | G06Q 10/06 705/7.18 |
| 2011/0093502 A1* | 4/2011 | Batra | G06Q 30/02 707/780 |
| 2011/0231409 A1* | 9/2011 | Dhara | H04L 12/1818 707/748 |
| 2011/0247051 A1 | 10/2011 | Bulumulla et al. | |
| 2012/0042218 A1 | 2/2012 | Cinarkaya et al. | |
| 2012/0218958 A1 | 8/2012 | Rangaiah | |
| 2012/0233137 A1 | 9/2012 | Jakobson et al. | |
| 2013/0212497 A1 | 8/2013 | Zelenko et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0247216 A1 | 9/2013 | Cinarkaya et al. | |
| 2013/0282833 A1* | 10/2013 | Chattopadhyay | H04L 65/403 709/206 |
| 2014/0058768 A1* | 2/2014 | Moxley | G06Q 10/02 705/5 |
| 2014/0101247 A1* | 4/2014 | Pappas | H04L 67/22 709/204 |
| 2014/0208215 A1* | 7/2014 | Deshpande | G06Q 10/00 715/736 |
| 2014/0280292 A1* | 9/2014 | Skinder | G06F 16/3338 707/767 |
| 2014/0330904 A1* | 11/2014 | Jackson | H04L 67/18 709/204 |
| 2014/0351205 A1* | 11/2014 | Fennell | G06F 16/22 707/609 |
| 2015/0081369 A1* | 3/2015 | Sarrazin | G06Q 10/109 705/7.18 |
| 2015/0088927 A1* | 3/2015 | Sarrazin | G06Q 10/109 707/769 |
| 2015/0134389 A1* | 5/2015 | Punera | G06Q 10/063114 705/7.15 |
| 2015/0248651 A1* | 9/2015 | Akutagawa | G06Q 10/1095 705/7.19 |
| 2015/0347534 A1* | 12/2015 | Gross | H04L 51/046 707/722 |
| 2015/0347981 A1* | 12/2015 | Adler | G06Q 10/1095 705/7.19 |
| 2016/0255466 A1* | 9/2016 | Shuster | H04W 4/023 455/414.3 |
| 2016/0267404 A1* | 9/2016 | Shicoff | G06Q 10/025 |
| 2017/0061386 A1* | 3/2017 | Haynes | G06Q 10/1095 |
| 2017/0098197 A1* | 4/2017 | Yu | G06Q 10/1095 |
| 2017/0236097 A1* | 8/2017 | Smith | G06Q 10/1095 705/7.19 |
| 2017/0308866 A1* | 10/2017 | Dotan-Cohen | H04L 43/0876 |
| 2018/0025322 A1* | 1/2018 | Kurghinyan | G06Q 10/1053 705/319 |
| 2018/0032967 A1* | 2/2018 | Barker | G06Q 10/063114 |
| 2018/0247249 A1* | 8/2018 | Huynh | G06F 3/04847 |
| 2019/0275458 A1* | 9/2019 | Marsh | B01D 53/0473 |

OTHER PUBLICATIONS

Elhadi M. Shakshuki and S. M. Hossain. 2014. A personal meeting scheduling agent. iPersonal Ubiquitous Computing (Apr. 2014), 909-922. (Year: 2014).*

* cited by examiner

DYNAMIC RECOMMENDATION METHODS AND SYSTEMS FOR DATABASE CHANGES

TECHNICAL FIELD

Embodiments of the subject matter described herein relate generally to database systems, and more particularly, to methods and systems for dynamically providing recommendations or suggestions in response to changes in a database.

BACKGROUND

Modern software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" or "on-demand" by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Multi-tenant cloud-based architectures have been developed to improve collaboration, integration, and community-based cooperation between customer tenants without sacrificing data security. Generally speaking, multi-tenancy refers to a system where a single hardware and software platform simultaneously supports multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost effective sharing of similar application features between multiple sets of users. For example, a multi-tenant system may support an on-demand customer relationship management (CRM) application that manages the data for a particular organization's sales staff that is maintained by the multi-tenant system and facilitates collaboration among members of that organization's sales staff (e.g., account executives, sales representatives, and the like).

One situation that arises in a CRM context occurs when an individual changes positions, employers, or the like, which, in turn, may influence that individual's database information and interrelationships. Additionally, new information may be continually added to the database, which may be relevant to existing information in the database but lack logical relationships for utilization by other users. Accordingly, it is desirable to provide systems and methods for dynamically providing recommendations or suggestions to users in response to database changes.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
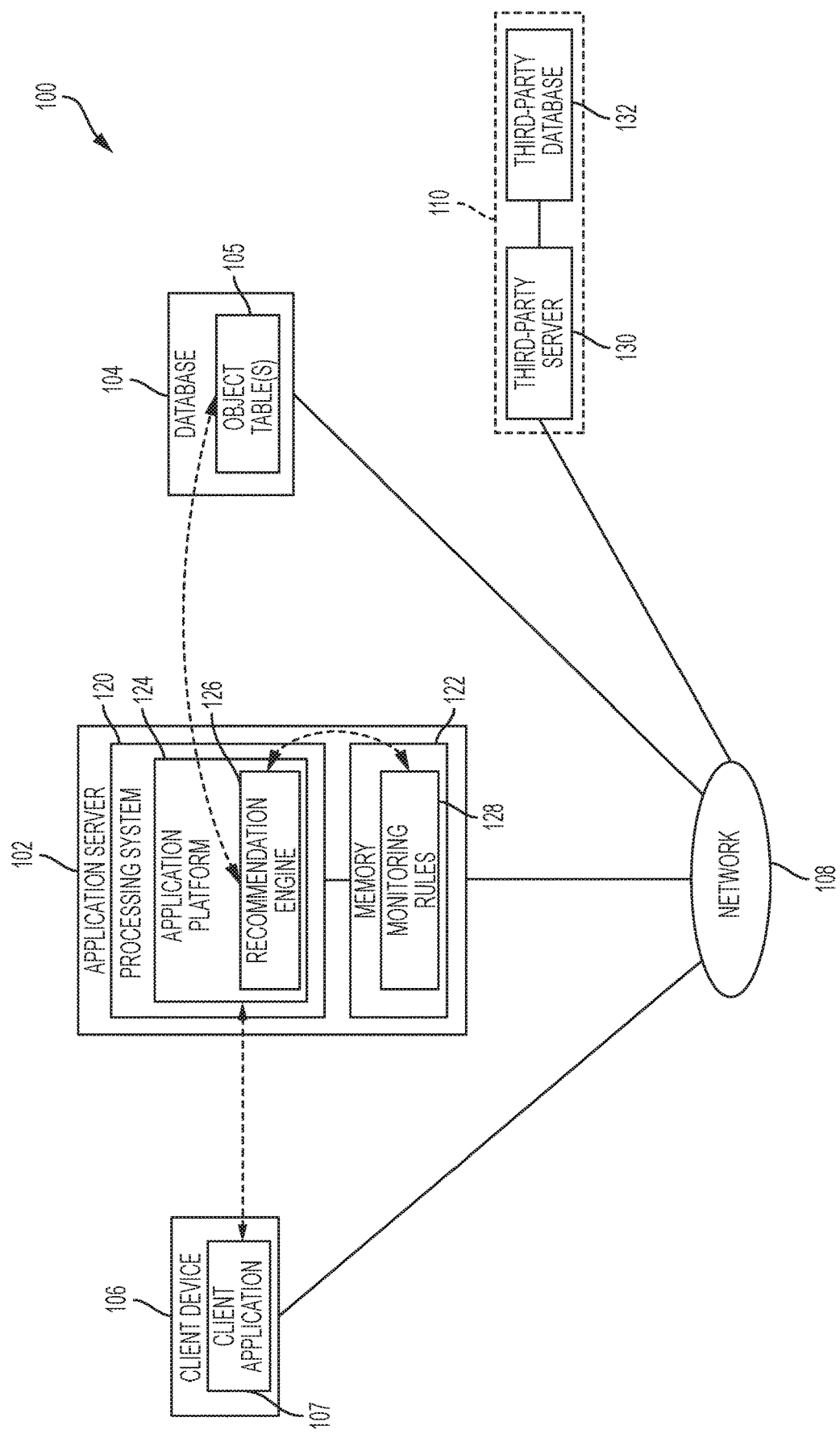
FIG. 1 is a block diagram of an exemplary computing system.

Embodiments of the subject matter described herein generally relate to methods and systems for providing suggestions or recommendations to a user that are responsive to or influenced by an action with respect to one or more fields of an object in the database. For example, in response to the value of a field of an object being changed, the database may be searched to identify other objects associated with that object that potentially could be influenced by the value of that field. Thereafter, suggestions or recommendations pertaining to those identified objects are generated in response to the change to the value of the field or in a manner that is otherwise influenced by the current value of the field. In exemplary embodiments, based on the previous value of the field, the field being changed, and/or other attributes of the changed object or an identified object, one or more additional database objects likely to be related to that identified object may be identified and corresponding recommendations or suggestions for logical associations between the identified object and those additional database objects are provided. Alternatively, based on the changed value of the field, the field being changed, or other attributes of the changed object or an identified object, it may be determined that one or more logical associations with the identified object should be terminated or deleted, and corresponding recommendations or suggestions for modifying those logical associations may similarly be provided.

For purposes of explanation, the subject matter is described herein primarily in the context of contact objects and other types of objects that may establish logical associations between contact objects, such as event objects corresponding to scheduled meetings or other activities. For example, in response to a change to a value of a field of a contact object occurs in the database (e.g., when an individual changes titles, positions, companies, locations, or the like), the database may be searched to identify event objects that were previously associated with that contact object. Based on the field that was changed and the new value of the field, additional contact objects that may be relevant to the event may be identified, for example, by matching values of that field of those contact objects to the new value of the field or the preceding value of the field, by matching values of other fields of the event to values of other fields of those contact objects, or the like. Additionally, whether the association between the contact object and the event should be maintained may also be determined based on the new value of the field or the field that was changed. Thereafter, indicia of suggested or recommended logical associations (or dissociations) between contact objects and the event may be provided to a user managing the event to thereby update logical associations with the event object in the database in response to the change of the field of a contact object previously associated with the event.

For example, when a contact changes companies, a meeting for which that contact is an invitee may be identified, and based on the updated company field associated with that contact, the title, subject, location or other metadata associated with the meeting, and/or the like, additional contacts to be invited to the meeting may be identified and/or whether to remove that contact from the meeting may be determined. Thereafter, the user who created the meeting or is otherwise responsible for managing the meeting may be provided with suggestions to invite those additional contacts to the meeting and/or to cancel the invitation of the contact that changed companies. Accordingly, another contact at that original company who assumes that previously invited contact's position or whose title or responsibilities overlaps that previously invited contact's position may be recommended for inclusion in the meeting in lieu of the that previously invited contact. Similarly, recommendations or suggestions may also be provided as new information is added to the database. For example, when a new contact is instantiated in the database, the values for one or more fields of that new contact may be utilized to identify events that may be relevant to that contact, and then suggestions or recommendations to add that new contact as invitees to those events in addition to or in lieu of a previously invited contact may be provided to the user responsible for managing the event.

While the subject matter may be described herein primarily in the context of contact and event objects, it should be appreciated the subject matter is not necessarily limited to any particular types of objects or fields thereof, and furthermore, the subject matter is not necessarily limited to any particular type of database action that triggers recommendations, suggestions, or other notifications. Moreover, in some embodiments, the subject matter is described herein in the context of an on-demand system, however, the subject matter is not necessarily limited to on-demand application or database systems, multi-tenant systems, or any other particular system architecture or arrangement described herein.

FIG. 1 depicts an exemplary embodiment of a computing system 100 suitable for providing suggestions or recommendations in response to actions performed with respect to fields of objects in a database 104. The illustrated computing system 100 includes, without limitation, the database 104, a server 102 communicatively coupled to the database 104, and one or more client devices 106 communicatively coupled to the server 102 via a communications network 108. The communications network 108 may be realized as any sort or combination of wired and/or wireless computer network, a cellular network, a mobile broadband network, a radio network, the Internet, or the like. In this regard, in various embodiments, the communication network 108 may be utilized to request and retrieve data from one or more third-party database systems 110 coupled to the network 108. It should be noted that FIG. 1 is a simplified representation of a computing system 100 for purposes of explanation and is not intended to be limiting. For example, in practice, multiple instances of client devices 106 communicating on the network 108 may be present.

The server 102 generally represents a computing device, computing system or another combination of processing logic, circuitry, hardware, and/or other components configured to support the dynamic suggestion processes, tasks, operations, and/or functions described herein. In this regard, the server 102 includes a processing system 120, which may be implemented using any suitable processing system and/or device, such as, for example, one or more processors, central processing units (CPUs), controllers, microprocessors, microcontrollers, processing cores and/or other hardware computing resources configured to support the operation of the processing system 120 described herein. The processing system 120 may include or otherwise access a data storage element 122 (or memory) capable of storing programming instructions for execution by the processing system 120, that, when read and executed, cause processing system 120 to support the processes described herein. Depending on the embodiment, the memory 122 may be realized as a random access memory (RAM), read only memory (ROM), flash memory, magnetic or optical mass storage, or any other suitable non-transitory short or long term data storage or other computer-readable media, and/or any suitable combination thereof. In one or more embodiments, the programming instructions cause the processing system 120 to create, generate, or otherwise facilitate the application platform 124 that generates or otherwise provides instances of the virtual application at run-time (or "on-demand") based at least in part upon code and other data that is stored or otherwise maintained by the database 104. Accordingly, for purposes of explanation but without limitation, the server 102 may alternatively be referred to herein as an application server 102.

In exemplary embodiments, the programming instructions also cause the processing system 120 to create, generate, or otherwise facilitate a recommendation engine 126 that supports the dynamic suggestion processes and related tasks, operations, and/or functions described herein. In some embodiments, the recommendation engine 126 is integrated with or otherwise incorporated as part of the virtual application. That said, in other embodiments, the recommendation engine 126 may be a separate or standalone process that independently analyzes objects in the database 104 and pushes or otherwise provides recommendations, suggestions, or other notifications to client devices 106. In one embodiment, the recommendation engine 126 updates or otherwise modifies one or more fields of objects in the database 104 to facilitate recommendations or suggestions provided within instances of the virtual application when the virtual application accesses those objects.

The client device 106 generally represents an electronic device coupled to the network 108 that may be utilized by a user to access the application platform 124 on the application server 102 to retrieve data from the database 104 via the network 108. In practice, the client device 106 can be realized as any sort of personal computer, mobile telephone, tablet or other network-enabled electronic device. In exemplary embodiments, the client device 106 includes a display device, such as a monitor, screen, or another conventional electronic display, capable of graphically presenting data and/or information provided by the application platform 124 along with a user input device, such as a touchscreen, a touch panel, a mouse, a joystick, a directional pad, a motion sensor, or the like, capable of receiving input from the user of the client device 106. The client device 106 executes a client application 107 that communicates with the application platform 124 and/or the recommendation engine 126 on the server 102 using a networking protocol. In some embodiments, the client application 107 is realized as a web browser or similar client application executed by the client device 106 that contacts the application server 102 and/or application platform 124 using a networking protocol, such as the hypertext transport protocol (HTTP) or the like, to access or otherwise initiate an instance of a virtual application presented on the client device 106.

In exemplary embodiments, the database 104 stores or otherwise maintains data for integration with or invocation by a virtual application in objects organized in object tables 105. In this regard, the database 104 includes a plurality of different object tables 105 configured to store or otherwise maintain alphanumeric values, metadata, or other descriptive information that define a particular instance of a respective type of object associated with a respective object table 105. For example, the virtual application may support a number of different types of objects that may be incorporated into or otherwise depicted or manipulated by the virtual application, with each different type of object having a corresponding object table 105 that includes columns or fields corresponding to the different parameters or criteria that define a particular instance of that object.

In exemplary embodiments described herein, the virtual application supports contact objects (e.g., a contact object type) where the contact object table 105 includes columns or fields corresponding to the different parameters or criteria that define a particular contact, such as, for example, the name, the employer or affiliated organization, the title or position, contact information, and the like. In exemplary embodiments described herein, the virtual application also supports event objects (e.g., an event object type) where the event object table 105 includes columns or fields corresponding to the different parameters or criteria that define a particular event, such as, for example, the date and/or time of the event, the location of the event, the subject or title of the event, the invitees or attendees for the event, and the like. In this regard, the field(s) or column(s) of an event object (e.g., an entry or row) in the event object table 105 that correspond to the invitees or attendees for the event may include identifiers corresponding to contact objects in contact object table(s) 105 associated with those invitees or attendees. In this manner, one or more field(s) of an event object may link or associate contact objects with the event object, thereby linking or associating the event with the contacts that are invited to the event or otherwise plan to attend the event.

As described in greater detail below in the context of FIG. 2, in exemplary embodiments, the recommendation engine 126 monitors one or more object tables 105 in the database 104 to detect or otherwise identify an action with respect to one or more fields of an object in the database 104. In response to an action in the database, the recommendation engine 126 identifies one or more additional objects in the database 104 that are likely to be related to or otherwise influenced by the action, and then generates or otherwise provides indication(s) of the identified object(s) for modifying or updating logical associations with those object(s) in the database 104. In exemplary embodiments, the memory 112 stores or otherwise maintains monitoring rules 128 which identify the fields of the object tables 105 to be monitored by the recommendation engine 126 for database actions along with the fields of object tables 105 to be utilized by the recommendation engine 126 when identifying related objects and providing corresponding suggestions or recommendations for database associations. In this regard, the monitoring rules 128 may be configurable by individual users and specific to a particular user supported by the computing system 100. In embodiments where the database 104 is realized as a multi-tenant database, the monitoring rules 128 may be specific to and configurable by a particular tenant supported in the computing system 100.

In accordance with one or more embodiments, the recommendation engine 126 monitors a contact object table 105 for changes to values for a particular contact field of contact objects in the table (e.g., within a particular column of the table). When the value for that field of an existing contact object is modified or a new value for that field of a new contact object is added, the recommendation engine 126 utilizes the identification of the field and/or the value resulting from the database action to search the event object table 105 to identify one or more event objects that are either associated with that contact object or are likely to be related to that event object based on the value of the field. Thereafter, for each identified event object, the recommendation engine 126 utilize other fields or attributes of the event object to identify other contacts in the database that are likely to be related to the event object or are already associated with the event object. The recommendation engine 126 then provides indication of recommended or suggested types of associations to be established or modified between the identified event object and one or more of the contact objects likely to be related to the event object.

For example, based on the changed value of a field of a contact object previously associated with an event object, the recommendation engine 126 may provide indication of a suggested dissociative relationship between that contact object and the event object based on the new value for the field while also providing indication of a suggested associative relationship between another contact object and the event object (e.g., in lieu of the previously associated contact object) based on the change, the changed value and/or other attributes of the event object, such as the title, subject, location, or the like. Thereafter, a user who created or otherwise manages the event may manipulate the client device 106 and/or client application 107 to accept or reject the suggested associative relationships, and thereby update the associations maintained between an event object and contact objects in the database 104 as described in greater detail below.

In one or more embodiments, the recommendation engine 126 may search or otherwise query one or more third-party database systems 110 for data or information that may be utilized in providing recommendations or suggestions. For example, the recommendation engine 126 may contact another server 130 on the network 108 and request that server 130 query its associated database 132 for information that may be relevant to the detected database action. In this regard, the third-party database systems 110 may be utilized to augment the data maintained by the database 104 to essentially fill gaps and identify potential logical relationships between contact objects and event objects that may not be identified based solely on data maintained in the database 104.

Figure 2:
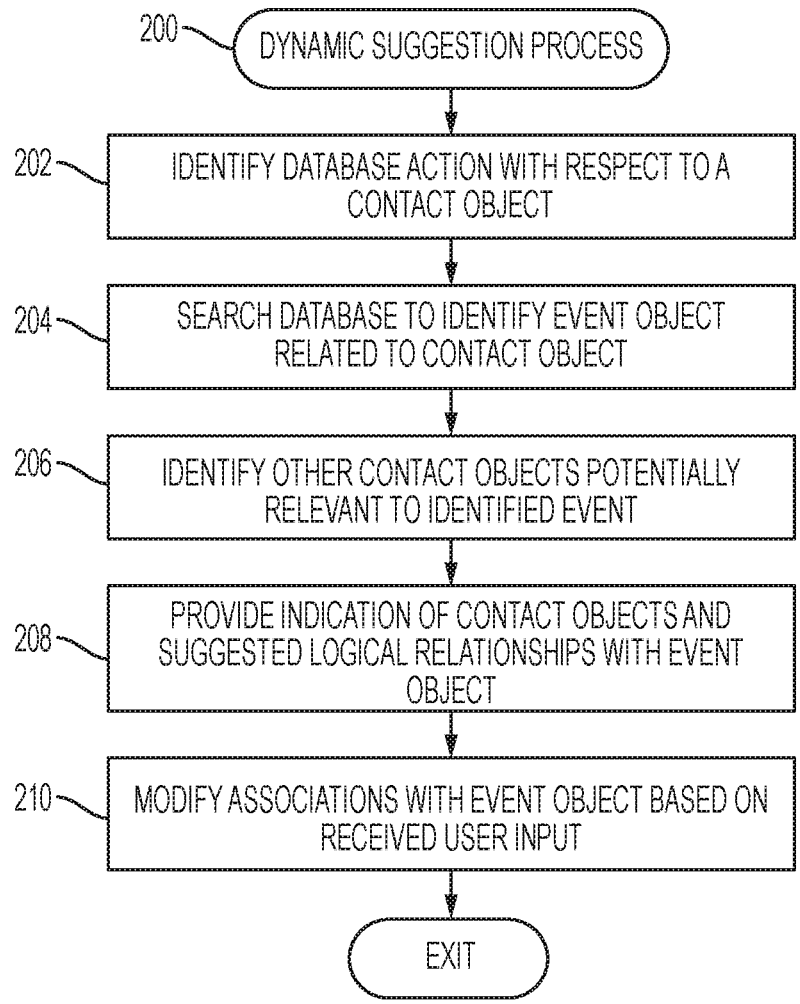
FIG. 2 is a flow diagram of an exemplary dynamic suggestion process suitable for implementation in the computing system of FIG. 1 in accordance with one or more embodiments.

FIG. 2 depicts an exemplary embodiment of a dynamic suggestion process 200 suitable for implementation in a computing system to suggest database associations in response to database actions. For purposes of explanation, the dynamic suggestion process 200 is described in the context of providing suggestions or recommendations for database associations between contact objects and an event object in response to a database action with respect to a contact object. For illustrative purposes, the following description may refer to elements mentioned above in connection with FIG. 1. In this regard, while portions of the dynamic suggestion process 200 may be performed by different elements of the computing system 100, for purposes of explanation, the subject matter is described herein primarily in the context of the dynamic suggestion process 200 being performed by the recommendation engine 126 implemented or executed by the processing system 120 at the server 102. It should be appreciated that the dynamic suggestion process 200 may include any number of additional or alternative tasks, the tasks need not be performed in the illustrated order and/or the tasks may be performed concurrently, and/or the dynamic suggestion process 200 may be incorporated into a more comprehensive procedure or process having additional functionality not described in detail herein. Moreover, one or more of the tasks shown and described in the context of FIG. 2 could be omitted from a practical embodiment of the dynamic suggestion process 200 as long as the intended overall functionality remains intact.

Depending on the embodiment, the dynamic suggestion process 200 may be performed substantially continuously, asynchronously (e.g., whenever an object of the type being monitored is changed or added), or on a periodic or regularly scheduled basis (e.g., hourly, daily, weekly, or the like). The illustrated dynamic suggestion process 200 detects or otherwise identifies a database action with respect to a field of a contact object in the database and searches or otherwise queries the database to identify one or more event objects that are likely to be relevant to the contact object or otherwise influenced by the database action (tasks 202, 204). In this regard, the recommendation engine 126 may monitor one or more particular fields (or columns) of a contact object table 105 to identify when a value of a field within the entries (or rows) associated with a particular entity (e.g., a user, a tenant, or the like) is changed or added.

For example, the recommendation engine 126 may monitor the employer name or associated organization field of the contact objects associated with a particular entity to identify when an existing contact has a change to its associated employer or organization. Thereafter, the recommendation engine 126 may access that contact object to obtain values from one or more fields of the contact object for searching the event object table 105 for potentially relevant event objects. For example, the recommendation engine 126 may obtain the unique identifier associated with the contact object and search the event object table 105 for event objects having a field for invitees or attendees that includes or matches that unique identifier, thereby identifying existing events associated with that contact object. Additionally, the recommendation engine 126 may obtain the new or updated value for the employer field and search the event object table 105 for event objects that may be relevant to that contact, such as, for example, an event object having a title or subject that includes the contact's new employer. In this regard, additional fields of the contact object may be utilized to filter or otherwise limit the potentially relevant event objects, for example, by determining whether the subject or title of the event is relevant to the contact's position or title with his or her new employer.

Still referring to FIG. 2, after identifying an event object relevant to the database action, the illustrated process 200 utilizes one or more fields of that event object to search the database for contact objects that are potentially relevant to the event object based on the database action (task 206). For example, when a contact previously invited to an event changes employers, the recommendation engine 126 may utilize the previous value for that contact's employer field and the title or subject of the event to identify another contact associated with that previous employer that may be relevant to the event. In this regard, the recommendation engine 126 may map the title or subject of a meeting to corresponding positions, titles, or job descriptions at that employer and then search the contact object table 105 for a contact object having a job title field that matches one of the mapped job titles and an employer field that matches the updated contact's previous employer. In some embodiments, the recommendation engine 126 may utilize the updated contact's previous title to search for another contact having the same or similar job at the updated contact's previous employer. Additionally, the recommendation engine 126 may analyze the fields of the updated contact object relative to the fields of an identified event object to determine whether the updated contact is relevant to the identified event object. For example, if the subject or title of the meeting pertains to the updated contact's previous employer, the recommendation engine 126 may determine that the updated contact is not relevant to the event object. Conversely, if the subject or title of the meeting pertains to the updated contact specifically independently of his or her employer (e.g., by using the contact's name in the subject or title), the recommendation engine 126 may determine that the updated contact is relevant to the event object.

In one or more embodiments, the recommendation engine 126 identifies potentially relevant objects and corresponding logical relationships at run-time when a field of a contact object is changed and then stores indicia of the recommended logical relationships between objects in a table of the database 104 with flag that indicates the recommendations are pending, temporary, or conditional subject to approval by a user associated with the identified event object. For example, in one embodiment, the recommendation engine 126 may update the event object in the event object table 105 to include an entry that identifies or cross-references a recommended contact object in the contact object table 105 for association, where the entry also includes a field or column having a Boolean value that indicates that the associative logical relationship not active (e.g., the recommendation is pending). Upon approval of a recommendation, the flag may be modified to establish the association with a recommended contact object on a permanent basis (e.g., so that the recommended contact receives notifications associated with the event and the like).

Still referring to FIG. 2, the suggestion process 200 continues by generating or otherwise providing indications of the identified contact objects and their suggested logical relationships to the identified event object (task 208). In this regard, when a user of the client device 106 views or otherwise accesses the identified event object via the client application 107 and the application platform 124, the instance of the virtual application generates or otherwise provides a graphical user interface (GUI) display of the event object on the client device 106 within the client application 107 that indicates the identified contact objects as being potentially relevant to the event along with their suggested associative or dissociative relationships with the event. For example, if the subject or title of the event pertains to the updated contact's previous employer, the GUI display for the event may include a graphical representation of the updated contact within an invitee or attendee list that uses a visually distinguishable characteristic (e.g., strike-through) to suggest or recommend that the contact be uninvited or unassociated with the event based on the new employer information. Additionally, for other contacts identified as being potentially relevant to the event, the GUI display for the event may include a graphical representation of the identified contact within the invitee or attendee list that uses a different visually distinguishable characteristic (e.g., bolding, underline, or the like) to suggest or recommend that the identified contacts should be invited or associated with the event.

In exemplary embodiments, the suggestion process 200 updates or otherwise modifies associations with the identified event object in response to user input accepting or declining the suggested logical relationships (task 210). For example, when a user of the client device 106 accepts a recommended dissociative relationship, the application platform 124 may automatically update the event object in the database 104 to remove the identifier for a contact object (e.g., the contact that changes employees). Conversely, when a user of the client device 106 accepts a recommended associative relationship, the application platform 124 may automatically update the event object in the database 104 to include the identifier(s) for the contact object(s) identified as potentially being relevant in the invitee or attendee fields of the event object, thereby associating those contacts with the event as invitees or attendees for the event. In some embodiments, in response to a contact being associated with an event, an notification (e.g., an email, text message, or the like) may be provided to the contact to indicate the change in his or her status with respect to event to enable the contact to accept or decline the modification (e.g., accept or decline an invitation).

For example, in one embodiment, the suggestion process 200 may be performed to update a GUI display for a meeting or similar event when one of the invitees for the meeting changes his or her title. In this regard, the recommendation engine 126 may monitor a title or position field of contact objects, and when the recommendation engine 126 identifies the value of the title field of a contact object has changed, the recommendation engine 126 searches an event object table 105 in the database 104 for event objects associated with that contact object. Thereafter, for each event object associated with that contact object, the recommendation engine 126 may compare or otherwise analyze the subject or title of the event, the contact's previous title and the contact's new or updated title, and determine whether the change to the contact's title decreases the relevance of the event to the contact. For example, the new title may indicate that the contact has changed divisions or responsibilities within the company and that the subject of the meeting is unlikely to be relevant to the contact's new position within the company. Accordingly, the recommendation engine 126 may recommend that the contact be dissociated from the event object (e.g., by retracting his or her invitation from the meeting). Additionally, based on the subject or title of the meeting and the contact's previous position at the company, the recommendation engine 126 searches a contact object table 105 in the database 104 to identify other contacts at that company that may be relevant attendees in lieu of the previously invited contact. For example, the recommendation engine 126 may identify another contact that has assumed the other contact's previous position within the company as potentially relevant to the meeting. Accordingly, the recommendation engine 126 may recommend that potentially contact be associated with the event object (e.g., by inviting the contact that assumed the previously invited contact's position).

A user who created or manages the meeting may receive a notification, and in response, may utilize the client application 107 to access the platform 124 to view a GUI display representative of the meeting. The GUI display may include graphical representations of various attributes of the meeting (e.g., subject, date, time, location, etc.) along with the list of participants that have been invited to the meeting. By virtue of the suggestion process 200, the graphical representation of the previously invited contact who has since changed positions may be displayed or otherwise rendered using a visually distinguishable characteristic (e.g., strikethrough) to indicate a recommended dissociative action with respect to that contact and the meeting. Additionally, a graphical representation of a potentially relevant contact who has assumed that contact's position may be added to the list of participants and displayed or otherwise rendered using a different visually distinguishable characteristic (e.g., bolding) to indicate a recommended associative action with respect to that contact and the meeting. Thus, the user may utilize the GUI display to review the suggestions for the meeting that were generated by the suggestion process 200 in response to one or more attributes of a meeting invitee changing in the database 104. The GUI display may include a button, hyperlink, or similar GUI element adapted to allow the user to accept or reject the suggestions generated by the recommendation engine 126. When the user accepts a suggestion, the application platform 124 and/or the recommendation engine 126 updates the contact and event objects in the database 104 to establish the new logical associations in the database 104, for example, by removing the unique identifier for the contact changing positions from an invitee field of the meeting event object and adding the unique identifier for the contact that assumed that previously invited contact's position to an invitee field of the meeting event object. Changes in the logical relationships between event objects and contact objects may be propagated to those contacts, for example, by modifying a contact's calendar of events and/or providing a notification to a contact of a change to his or her calendar.

Similarly, when a contact changes companies or organizations, the recommendation engine 126 analyzes event objects associated with that contact to determine whether or not to maintain those logical relationships. In this regard, for each event object, the recommendation engine 126 may analyze the subject, title, location, description, or other fields of an event object to determine whether the event is specific to that contact's previous company or organization. When the recommendation engine 126 determines that the event is specific to that contact's previous company or organization, the recommendation engine 126 suggests dissociating the contact from the event and searches the database 104 for other contacts at the updated contact's previous company or organization that may be relevant to those fields of the event object and suggests association the identified contact(s) with the event in lieu of the updated contact. That said, in other embodiments, based on the fields of the event object, the recommendation engine 126 may determine that the event is specific to that contact independent of the contact's company or organizational affiliation. In such embodiments, the recommendation engine 126 may suggest maintaining an association with the contact for those events. In some embodiments, for an event is specific to a particular contact, the recommendation engine 126 suggests dissociating other previously invited contacts that are associated with that particular contact's previous company or organization. Thus, it may be recommended that individuals who may have been previously invited based on their affiliation with a particular individual be dissociated when that affiliation no longer exists. Additionally, in some embodiments, the recommendation engine 126 may search the database 104 for potentially relevant contacts at that particular contact's new company or organization and suggest associating additional contacts to the event object based on the newly identified affiliation with the previously invited contact.

In addition to the suggestion process 200 being performed responsive to changes to values of existing objects in the database 104, the suggestion process 200 may also be performed in response to the creation or addition of new objects in the database 104. For example, when a new event object is added to the database 104, the recommendation engine 126 may utilize values for one or more fields of the event object to search a contact object table 105 for a contact that is likely to be relevant to the event object and suggest that contact be invited and thereby associated with the event object. Similarly, when a new contact object is added to the database 104, the recommendation engine 126 may utilize values for one or more fields of the new contact object to search an event object table 105 for an event that is likely to be relevant to the new contact object and suggest that the new contact be invited and thereby associated with the event object.

In one or more embodiments, the suggestion process 200 utilizes a third-party database system 110 to augment or otherwise influence the suggestions. For example, if a contact changes companies or employers and the recommendation engine 126 is unable to identify another contact that matches that contact's previous combination of job title at the original company, the recommendation engine 126 may query the third-party database system 110 for a contact that matches the updated contact's previous job title and previous company. The third-party database system 110 may return contact information for a matching contact in its database 132, which, in turn, may be utilized by the recommendation engine 126 to suggest that contact as a potential invitee or attendee for a meeting in lieu of a contact that has changed companies. In some embodiments, the recommendation engine 126 may utilize contact information received from the database system 110 to create a corresponding contact object in the database 104 that supports subsequent associations with event objects in the database 104.

FIGS. 3-6 depict exemplary GUI displays that may be presented on a client device 106 in conjunction with the process 200 of FIG. 2 to dynamically provide recommendations of contact objects for association with an event object as invitees. In this regard, the process 200 may recommend different invitees for an event or other changes to the invitees (e.g., removal of a previous invitee) when one or more fields associated with a previously-invited contact object (e.g., an existing invitee) changes, or when a new contact object is added to the database 104 that includes values for one or more fields that indicate the new contact object may be relevant to an existing event. For purposes of illustration, the examples depicted in FIGS. 3-6 illustrate a scenario when existing contact "Leanne Tomlin" previously associated with the "Acme" organization or the "Global Media" account of the Acme organization is no longer affiliated with the Acme organization or its Global Media account (e.g., Leanne Tomlin no longer occupies her previous position or title), and another contact "Garett Cooks" is associated with an organization, position or title that may be relevant to the existing event pertaining to the Acme Global Media account (e.g., if Garett Cooks is hired to replace Leanne Tomlin).

It should be noted that although FIGS. 3-6 depict the two recommendations or suggestions being provided concurrently, in practice, they may be provided independently of one another. For example, dissociation of Leanne Tomlin with the event may be recommended or suggested by the process 200 upon leaving Acme, and subsequently, upon the addition of Garett Cooks to the database 104, the process 200 may subsequently recommend or suggest inviting Garett Cooks to the event independently of the change in Leanne Tomlin's status. That said, depending on when a user views the event, the recommendations or suggestions may be perceived as being generated concurrently, when in fact they were automatically generated at different times or independent of one another. For example, a change to the Acme account associated with Leanne Tomlin may trigger the recommendation engine 126 to search for alternate contacts potentially relevant to the Acme Global Media account while also recommending dissociative logical relationships between Leanne Tomlin and events or other existing database objects associated with the Acme Global Media account. In this regard, the recommendation engine 126 identifies event objects in the database 104 pertaining to the Acme Global Media account that Leanne Tomlin is associated with and flags the Leanne Tomlin entry associated with those event objects in the event object table 105 to indicate the associations are not recommended. In response to identifying Garett Cooks as being relevant to the Acme Global Media account, the recommendation engine 126 adds the Garett Cooks contact object to the relevant event objects in the database 104 as an invited contact associated with those event objects with flag in the event object table 105 indicating the associations are recommended and not yet active. Similarly, creation of the Garett Cooks contact object may trigger the recommendation engine 126 to search for potentially relevant event objects and recommend associations with the identified event objects.

Figure 3:
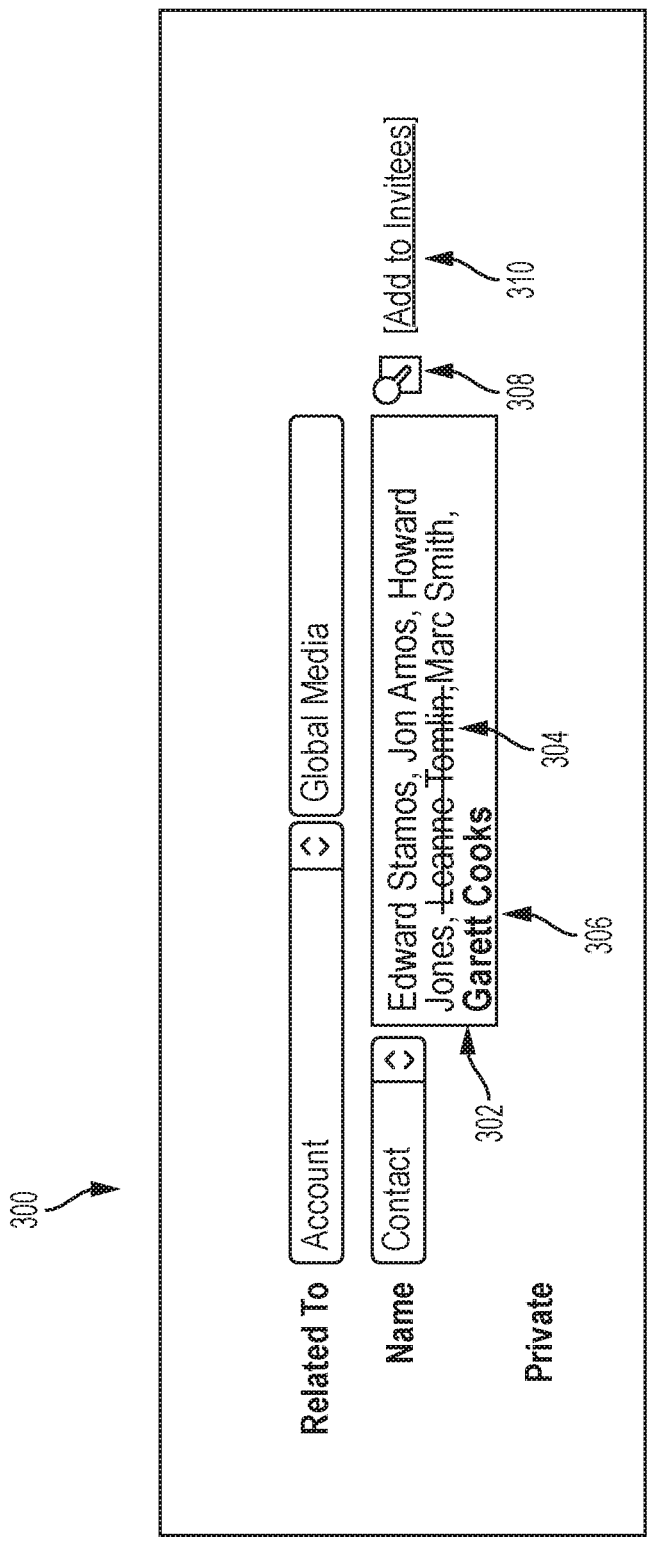
FIGS. 3-6 depict exemplary graphical user interface (GUI) displays for providing dynamic suggestions of contacts for association with an event as invitees in accordance with one or more exemplary embodiments of the dynamic suggestion process of FIG. 2.

FIG. 3 depicts an event detail GUI display 300 for an event corresponding to a meeting related to the Global Media account associated with the Acme organization. The meeting information depicted in the GUI display 300 includes an invitee list region 302 including graphical representations of the contact objects that have been previously associated with the meeting as invitees. In this regard, FIG. 3 depicts the invitee list region 302 after the dynamic suggestion process 200 has detected changes to the fields of the Leanne Tomlin contact object that indicate she should be dissociated or uninvited from the meeting. Accordingly, in response to detecting the changes suggesting a dissociative relationship between the Leanne Tomlin contact object and the meeting event object, the recommendation engine 126 generates the graphical representation 304 of the Leanne Tomlin contact object within the invitee list 302 using a visually distinguishable characteristic (e.g., strikethrough) that recommends or suggests that Leanne Tomlin be removed from the invitee list. Similarly, in response to identifying or detecting fields of the Garett Cooks contact object that indicate potential relevance to the meeting event object, the recommendation engine 126 generates a graphical representation 306 of the Garett Cooks contact object within the invitee list 302 using a visually distinguishable characteristic (e.g., bolding) that recommends or suggests that Garett Cooks be invited to the meeting. Thereafter, a user viewing the recommendations depicted in the invitee list 302 may select another GUI element 308, 310 within the GUI display 300 to modify the contacts associated with the event accordingly.

Figure 4:
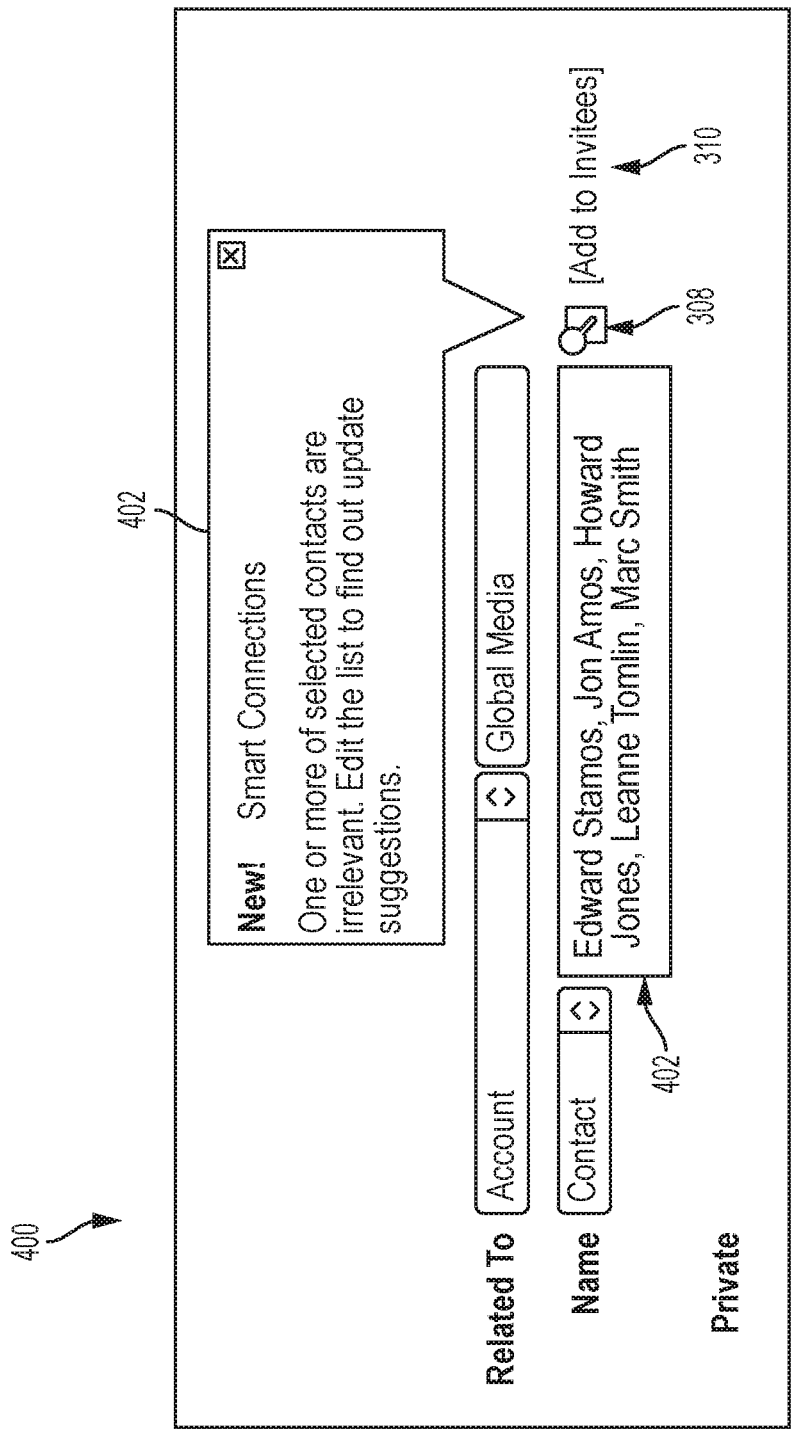

FIG. 4 depicts another embodiment of an event detail GUI display 400 for an event corresponding to a meeting related to the global media account associated with the Acme organization. In the embodiment of FIG. 4, rather than modifying the presentation of invitee contact objects within the invitee list 402, the recommendation engine 126 generates or otherwise provides a graphical indication 402 of the existence of recommended or suggested changes to the contact objects associated with the event object, with the indication 402 being presented proximate to or otherwise in graphical or visual association with a GUI element 308, 310 for modifying the contact objects associated with the event object. Although FIG. 4 depicts the indication 402 as being realized as a pop-up window, in practice, the graphical indication does not necessarily need to be an additional GUI element, and indication of the existence of recommended or suggested changes to the invitees could be achieved by rendering one or more of the invitee list region 402 or GUI elements 308, 310 using a visually distinguishable characteristic (e.g., bolding the border of one or more of the GUI elements 402, 308, 310, highlighting one or more of the GUI elements 402, 308, 310 using graphical effects or colors, etc.) that draws the user's attention toward the potential need to inspect or edit the invitee list 402.

Figure 5:
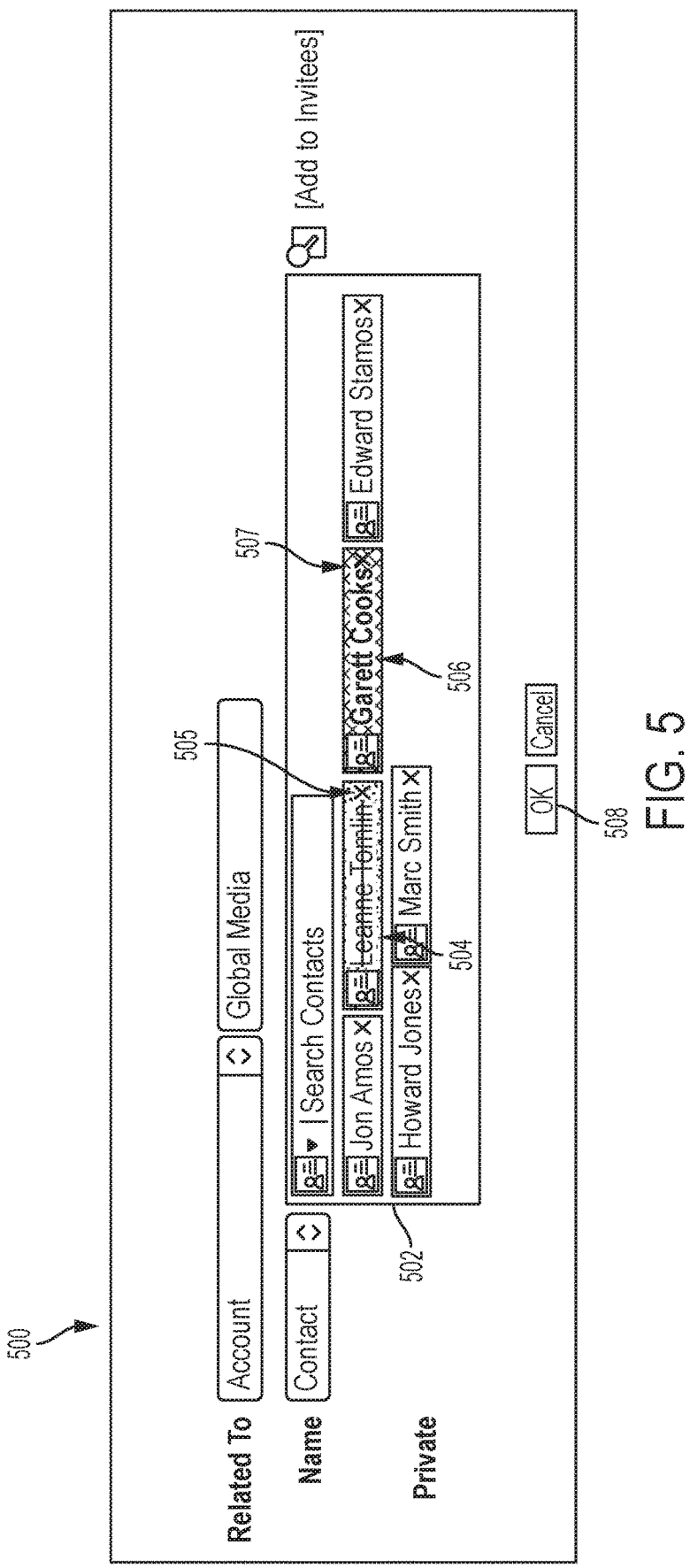

FIG. 5 depicts an embodiment of a GUI display 500 including an editable invitee list region 502 for modifying invitees, and thereby contact objects associated with a meeting event object. In various embodiments, the GUI display 500 could be presented in response to selection of one of the GUI elements 308, 310 or the invitee list region 302, 402. Alternatively, the editable invitee list region 502 could be presented in lieu of an invitee list region 302, 402 in response to selection of one of the GUI elements 308, 310 or the invitee list region 302, 402. The illustrated editable invitee list region 502 includes actionable or selectable GUI elements (e.g., icons) corresponding to the respective contact objects associated with the event object. The Leanne Tomlin contact object icon 504 is rendered with a visually distinguishable color or fill pattern along with the textual representation of the contact name being rendered using strikethrough to indicate the recommended dissociation of the Leanne Tomlin contact object icon with the meeting, and the user may select an embedded GUI element or region 505 of the icon 504 to remove and thereby dissociate Leanne Tomlin from the meeting. In response to the dissociation of the Leanne Tomlin contact object from the meeting, the recommendation engine 126 may automatically update the meeting event object and the Leanne Tomlin contact objects in the database 104 to remove the association. In some embodiments, in response to the dissociation, the application platform 124 and/or the recommendation engine 126 may automatically generate a notification (e.g., an email, meeting cancellation notice, or the like) which may be provided to Leanne Tomlin, either in real-time or when Leanne Tomlin subsequently logs in to a virtual application provided by the application platform 124.

The Garett Cooks contact object icon 506 is similarly rendered using a different visually distinguishable color or fill pattern along with the textual representation of the contact name being rendered using bolding to indicate the recommended association of the Garett Cooks contact object with the meeting. The user may select an embedded GUI element or region 507 of the icon 506 to decline the suggestion and prevent the invitation of Garett Cooks to the meeting, or alternatively, select another GUI element 508 of the GUI display 500 to accept the recommendation. In response to the user accepting the recommendation, the recommendation engine 126 may automatically update the meeting event object and the Garett Cooks contact objects in the database 104 to maintain the association or logical relationship between the objects. In some embodiments, in response to the association, the application platform 124 and/or the recommendation engine 126 may automatically generate a notification (e.g., an email, meeting cancellation notice, or the like) which may be provided to Garett Cooks, either in real-time or when Garett Cooks subsequently logs in to a virtual application provided by the application platform 124. In some embodiments, the association may be conditional upon approval by Garett Cooks, in which case, if Garett Cooks declines the invitation, the application platform 124 may subsequently update the meeting event object to dissociate the Garett Cooks contact object.

Figure 6:
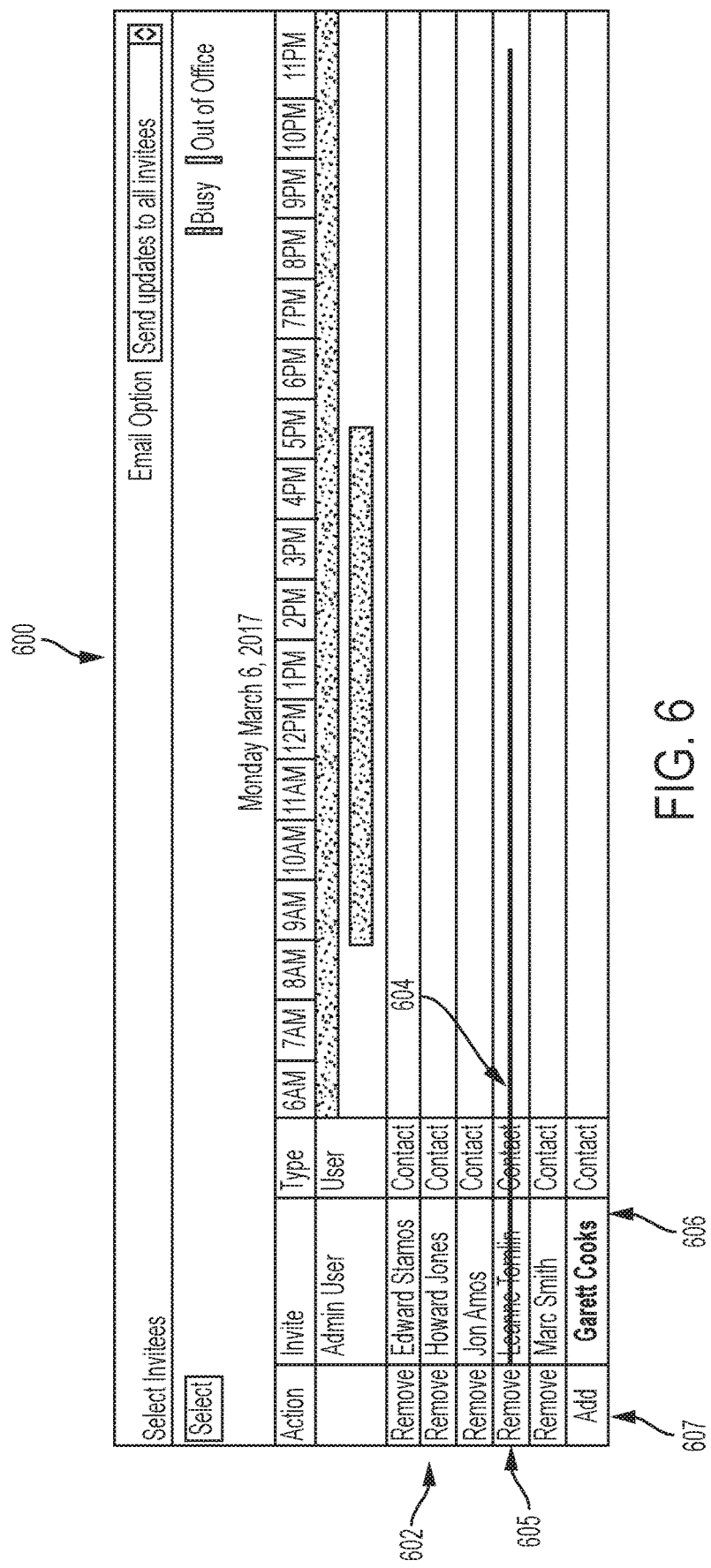

FIG. 6 depicts another embodiment of a scheduling GUI display 600 for modifying invitees which may be presented in response to selection of one of the GUI elements 308, 310 of an event detail GUI display 308, 310. The scheduling GUI display 600 includes an invitee list 602 (e.g., a listing of invitees in rows) with corresponding columns of temporal availability or other scheduling information for the respective invitees. In this regard, the row 604 of the scheduling GUI display 600 corresponding to the Leanne Tomlin contact object is rendered using a visually distinguishable characteristic indicating the recommended dissociation of Leanne Tomlin from the meeting (e.g., by depicting her name and corresponding availability using strikethrough). A user may manipulate or otherwise select a selectable GUI element 605 corresponding to the Leanne Tomlin contact object row 604 of the scheduling GUI display 600 to remove Leanne Tomlin from the invitee list. In response to selection of the GUI element 605, the recommendation engine 126 may automatically update the meeting event object and the Leanne Tomlin contact objects in the database 104 to remove the association, and thereby dissociate the Leanne Tomlin contact object and the meeting event object and provide corresponding notification to Leanne Tomlin.

In response to identifying the potentially-relevant Garett Cooks contact object the recommendation engine 126 adds a new row 606 to the bottoms of the invitee list 602 corresponding to the Garett Cooks contact object. Within the row 606 corresponding to the Garett Cooks object, the name Garett Cooks is rendered using a visually distinguishable characteristic (e.g., bolding) indicating the recommended association of Garett Cooks to the meeting. The borders, outline or other aspects or contents of the row 606 may also be rendered in a manner that indicates row 606 corresponds to a contact object recommended for association. A user may manipulate or otherwise select a selectable GUI element 607 corresponding to the Garett Cooks contact object row 606 of the scheduling GUI display 600 to add Garett Cooks to the invitee list. In response to selection of the GUI element 605, the recommendation engine 126 may automatically update the meeting event object and the Garett Cooks contact objects in the database 104 to establish the association between the objects and provide corresponding notification to Garett Cooks in a similar manner as described above.

It should also be appreciated that FIGS. 3-6 depict non-limiting examples of GUI displays that are not intended to be exhaustive, and there are numerous equivalent manners in which a user could be notified of recommended logical relationships between database objects.

Figure 7:
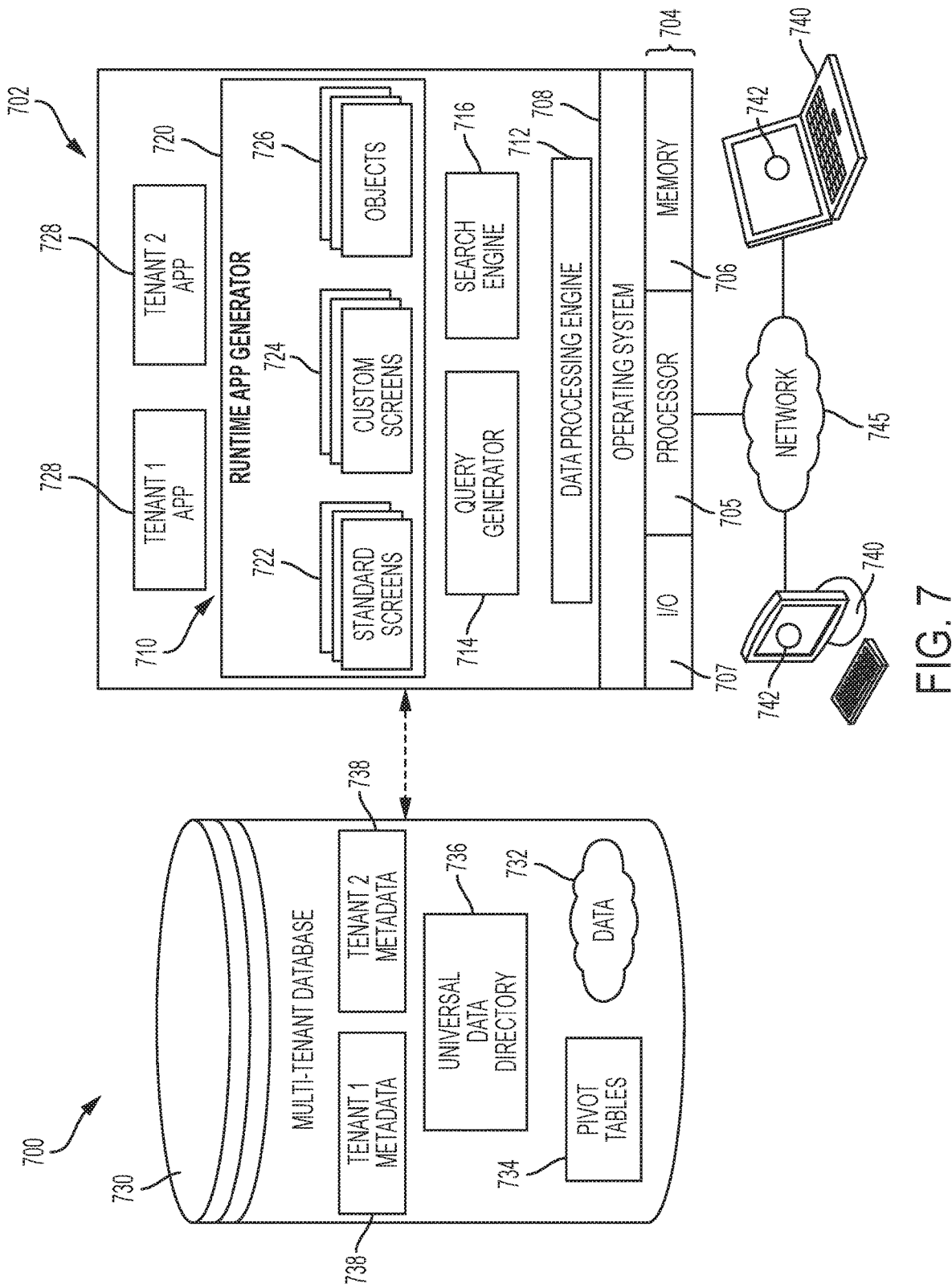
FIG. 7 is a block diagram of an exemplary multi-tenant system suitable for use with the computing system of FIG. 1 in accordance with one or more embodiments.

FIG. 7 depicts an exemplary embodiment of an on-demand multi-tenant database system 700 suitable for use with the suggestion process 200 of FIG. 2 in the computing system 100 of FIG. 1. The illustrated multi-tenant system 700 of FIG. 7 includes a server 702, such as server 102, that dynamically creates and supports virtual applications 728 based upon data 732 from a common database 730 (e.g., database 104) that is shared between multiple tenants, alternatively referred to herein as a multi-tenant database. Data and services generated by the virtual applications 728 are provided via a network 745 (e.g., network 108) to any number of client devices 740 (e.g., client device 106, or the like), as desired. Each virtual application 728 is suitably generated at run-time (or on-demand) using a common application platform 710 that securely provides access to the data 732 in the database 730 for each of the various tenants subscribing to the multi-tenant system 700. In accordance with one non-limiting example, the multi-tenant system 700 is implemented in the form of an on-demand multi-tenant customer relationship management (CRM) system that can support any number of authenticated users of multiple tenants.

As used herein, a "tenant" or an "organization" should be understood as referring to a group of one or more users that shares access to common subset of the data within the multi-tenant database 730. In this regard, each tenant includes one or more users associated with, assigned to, or otherwise belonging to that respective tenant. To put it another way, each respective user within the multi-tenant system 700 is associated with, assigned to, or otherwise belongs to a particular tenant of the plurality of tenants supported by the multi-tenant system 700. Tenants may represent customers, customer departments, business or legal organizations, and/or any other entities that maintain data for particular sets of users within the multi-tenant system 700 (i.e., in the multi-tenant database 730). For example, the application server 702 may be associated with one or more tenants supported by the multi-tenant system 700. Although multiple tenants may share access to the server 702 and the database 730, the particular data and services provided from the server 702 to each tenant can be securely isolated from those provided to other tenants (e.g., by restricting other tenants from accessing a particular tenant's data using that tenant's unique organization identifier as a filtering criterion). The multi-tenant architecture therefore allows different sets of users to share functionality and hardware resources without necessarily sharing any of the data 732 belonging to or otherwise associated with other tenants.

The multi-tenant database 730 is any sort of repository or other data storage system capable of storing and managing the data 732 associated with any number of tenants. The database 730 may be implemented using any type of conventional database server hardware. In various embodiments, the database 730 shares processing hardware 704 with the server 702. In other embodiments, the database 730 is implemented using separate physical and/or virtual database server hardware that communicates with the server 702 to perform the various functions described herein. In an exemplary embodiment, the database 730 includes a database management system or other equivalent software capable of determining an optimal query plan for retrieving and providing a particular subset of the data 732 to an instance of virtual application 728 in response to a query initiated or otherwise provided by a virtual application 728. The multi-tenant database 730 may alternatively be referred to herein as an on-demand database, in that the multi-tenant database 730 provides (or is available to provide) data at run-time to on-demand virtual applications 728 generated by the application platform 710.

In practice, the data 732 may be organized and formatted in any manner to support the application platform 710. In various embodiments, the data 732 is suitably organized into a relatively small number of large data tables to maintain a semi-amorphous "heap"-type format. The data 732 can then be organized as needed for a particular virtual application 728. In various embodiments, conventional data relationships are established using any number of pivot tables 734 that establish indexing, uniqueness, relationships between entities, and/or other aspects of conventional database organization as desired. Further data manipulation and report formatting is generally performed at run-time using a variety of metadata constructs. Metadata within a universal data directory (UDD) 736, for example, can be used to describe any number of forms, reports, workflows, user access privileges, business logic and other constructs that are common to multiple tenants. Tenant-specific formatting, functions and other constructs may be maintained as tenant-specific metadata 738 for each tenant, as desired. Rather than forcing the data 732 into an inflexible global structure that is common to all tenants and applications, the database 730 is organized to be relatively amorphous, with the pivot tables 734 and the metadata 738 providing additional structure on an as-needed basis. To that end, the application platform 710 suitably uses the pivot tables 734 and/or the metadata 738 to generate "virtual" components of the virtual applications 728 to logically obtain, process, and present the relatively amorphous data 732 from the database 730.

The server 702 is implemented using one or more actual and/or virtual computing systems that collectively provide the dynamic application platform 710 for generating the virtual applications 728. For example, the server 702 may be implemented using a cluster of actual and/or virtual servers operating in conjunction with each other, typically in association with conventional network communications, cluster management, load balancing and other features as appropriate. The server 702 operates with any sort of conventional processing hardware 704, such as a processor 705, memory 706, input/output features 707 and the like. The input/output features 707 generally represent the interface(s) to networks (e.g., to the network 745, or any other local area, wide area or other network), mass storage, display devices, data entry devices and/or the like. The processor 705 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 706 represents any non-transitory short or long term storage or other computer-readable media capable of storing programming instructions for execution on the processor 705, including any sort of random access memory (RAM), read only memory (ROM), flash memory, magnetic or optical mass storage, and/or the like. The computer-executable programming instructions, when read and executed by the server 702 and/or processor 705, cause the server 702 and/or processor 705 to create, generate, or otherwise facilitate the application platform 710 and/or virtual applications 728 and perform one or more additional tasks, operations, functions, and/or processes described herein. It should be noted that the memory 706 represents one suitable implementation of such computer-readable media, and alternatively or additionally, the server 702 could receive and cooperate with external computer-readable media that is realized as a portable or mobile component or application platform, e.g., a portable hard drive, a USB flash drive, an optical disc, or the like.

The application platform 710 is any sort of software application or other data processing engine that generates the virtual applications 728 that provide data and/or services to the client devices 740. In a typical embodiment, the application platform 710 gains access to processing resources, communications interfaces and other features of the processing hardware 704 using any sort of conventional or proprietary operating system 708. The virtual applications 728 are typically generated at run-time in response to input received from the client devices 740. For the illustrated embodiment, the application platform 710 includes a bulk data processing engine 712, a query generator 714, a search engine 716 that provides text indexing and other search functionality, and a runtime application generator 720. Each of these features may be implemented as a separate process or other module, and many equivalent embodiments could include different and/or additional features, components or other modules as desired.

The runtime application generator 720 dynamically builds and executes the virtual applications 728 in response to specific requests received from the client devices 740. The virtual applications 728 are typically constructed in accordance with the tenant-specific metadata 738, which describes the particular tables, reports, interfaces and/or other features of the particular application 728. In various embodiments, each virtual application 728 generates dynamic web content that can be served to a browser or other client program 742 associated with its client device 740, as appropriate.

The runtime application generator 720 suitably interacts with the query generator 714 to efficiently obtain multi-tenant data 732 from the database 730 as needed in response to input queries initiated or otherwise provided by users of the client devices 740. In a typical embodiment, the query generator 714 considers the identity of the user requesting a particular function (along with the user's associated tenant), and then builds and executes queries to the database 730 using system-wide metadata 736, tenant specific metadata 738, pivot tables 734, and/or any other available resources. The query generator 714 in this example therefore maintains security of the common database 730 by ensuring that queries are consistent with access privileges granted to the user and/or tenant that initiated the request. In this manner, the query generator 714 suitably obtains requested subsets of data 732 accessible to a user and/or tenant from the database 730 as needed to populate the tables, reports or other features of the particular virtual application 728 for that user and/or tenant.

Still referring to FIG. 7, the data processing engine 712 performs bulk processing operations on the data 732 such as uploads or downloads, updates, online transaction processing, and/or the like. In many embodiments, less urgent bulk processing of the data 732 can be scheduled to occur as processing resources become available, thereby giving priority to more urgent data processing by the query generator 714, the search engine 716, the virtual applications 728, etc.

In exemplary embodiments, the application platform 710 is utilized to create and/or generate data-driven virtual applications 728 for the tenants that they support. Such virtual applications 728 may make use of interface features such as custom (or tenant-specific) screens 724, standard (or universal) screens 722 or the like. Any number of custom and/or standard objects 726 may also be available for integration into tenant-developed virtual applications 728. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. For example, a virtual CRM application may utilize standard objects 726 such as "account" objects, "opportunity" objects, "contact" objects, or the like. The data 732 associated with each virtual application 728 is provided to the database 730, as appropriate, and stored until it is requested or is otherwise needed, along with the metadata 738 that describes the particular features (e.g., reports, tables, functions, objects, fields, formulas, code, etc.) of that particular virtual application 728. For example, a virtual application 728 may include a number of objects 726 accessible to a tenant, wherein for each object 726 accessible to the tenant, information pertaining to its object type along with values for various fields associated with that respective object type are maintained as metadata 738 in the database 730. In this regard, the object type defines the structure (e.g., the formatting, functions and other constructs) of each respective object 726 and the various fields associated therewith.

Still referring to FIG. 7, the data and services provided by the server 702 can be retrieved using any sort of personal computer, mobile telephone, tablet or other network-enabled client device 740 on the network 745. In an exemplary embodiment, the client device 740 includes a display device, such as a monitor, screen, or another conventional electronic display capable of graphically presenting data and/or information retrieved from the multi-tenant database 730. Typically, the user operates a conventional browser application or other client program 742 (e.g., client application 107) executed by the client device 740 to contact the server 702 via the network 745 using a networking protocol, such as the hypertext transport protocol (HTTP) or the like. The user typically authenticates his or her identity to the server 702 to obtain a session identifier ("SessionID") that identifies the user in subsequent communications with the server 702. When the identified user requests access to a virtual application 728, the runtime application generator 720 suitably creates the application at run time based upon the metadata 738, as appropriate. As noted above, the virtual application 728 may contain Java, ActiveX, or other content that can be presented using conventional client software running on the client device 740; other embodiments may simply provide dynamic web or other content that can be presented and viewed by the user, as desired.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to querying and other database functions, multi-tenancy, cloud computing, on-demand applications, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first," "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another. In one or more exemplary embodiments, the subject matter described herein is implemented in conjunction with a virtual customer relationship management (CRM) application in a multi-tenant environment.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A method of providing suggestions pertaining to an event object in a database, the event object corresponding to an existing event comprising a scheduled meeting or activity and the event object being associated with an existing contact object in the database, the method comprising:
    monitoring, by a server coupled to the database, an organization field of a contact object table in the database to identify a change to a value of the organization field of the existing contact object in the contact object table in the database from a previous value for the organization field, wherein the value of the organization field defines a contact corresponding to the existing contact object;
    in response to the change:
        searching, by the server, using a unique identifier associated with the existing contact object to identify the event object corresponding to the existing event in the database;
        identifying, by the server, a subject of the event object corresponding to the existing event utilizing one or more fields of the event object, wherein the one or more fields define the existing event and the one or more fields include a subject field; and
        identifying, by the server, a second contact object in the database likely to be related to the event object based on the change to the organization field of the existing contact object and the subject field of the event object by:
            mapping the subject of the existing event to a second value for a job title field of the contact object table; and
            searching the contact object table in the database to identify the second contact object having the second value for the job title field and the previous value for the organization field;
    providing, by the server, a scheduling graphical user interface including an invitee list region within the scheduling graphical user interface comprising a graphical representation of the second contact object using a visually distinguishable characteristic that suggests the second contact object as a potential invitee for association with the event object in lieu of the existing contact object on a client device associated with a user associated with the existing event; and
    updating, by the server, the event object in the database to include an entry that identifies the second contact object to maintain an association between the event object and the second contact object.

2. The method of claim 1, further comprising:
    providing, by the server, a second indication to dissociate the existing contact object and the event object on the client device; and
    updating, by the server, the database to remove a second association between the event object and the existing contact object in response to the input at the client device.

3. The method of claim 2, further comprising searching the database for the event object associated with the existing contact object in response to detecting the change to the organization field of the existing contact object.

4. The method of claim 2, wherein:
providing the recommendation comprises displaying a graphical representation of the second contact object using a first visually distinguishable characteristic;
providing the second indication comprises displaying a graphical representation of the existing contact object using a second visually distinguishable characteristic; and
the first visually distinguishable characteristic and the second visually distinguishable characteristic are different.

5. A computing system comprising:
a database to maintain a plurality of contact objects and a plurality of event objects; and
a server computing device comprising a processing system and a data storage element, the server being coupled to the database and a network to monitor an organization field of a contact object table in the database to identify a change to a value of the organization field from a previous value of the organization field of an existing contact object of the plurality of contact objects in the database, search the database using a unique identifier associated with the existing contact object to identify an event object of the plurality of event objects corresponding to an existing event in response to the change, identify a subject of the event object corresponding to the existing event utilizing one or more fields of the event object, identify a second contact object of the plurality of contact objects in the database likely to be related to the event object based on the change to the organization field and a subject field of the one or more fields of the event object by mapping the subject of the existing event to a second value for a job title field of a contact object table in the database and searching the contact object table in the database to identify the second contact object having the second value for the job title field and the previous value for the organization field, and provide a scheduling graphical user interface (GUI) display including indicia of suggested logical relationships between the existing contact object, the second contact object, and the event object on a client device associated with a user associated with the existing event via the network, wherein the server updates the event object in the database to include an entry that identifies the second contact object to maintain the suggested logical relationships in response to an input at the client device, wherein:
the organization field defines a contact corresponding to the first contact object;
the one or more fields define the existing event;
the existing event comprises a scheduled meeting or activity associated with the first contact object; and
the scheduling GUI display includes an invitee list region comprising a graphical representation of the second contact object using a visually distinguishable characteristic that suggests the second contact object as a potential invitee for association with the event object in lieu of the existing contact object.

6. The computing system of claim 5, the scheduling GUI display including a GUI element, wherein the server updates the database to maintain the suggested logical relationships in response to manipulation of the GUI element.

7. The computing system of claim 6, wherein the indicia comprise graphical representations of the first and second contact objects using different visually distinguishable characteristics.

8. The method of claim 1, wherein updating the event object comprises providing a flag for the entry that indicates the association is conditional subject to approval by the user.

9. The method of claim 8, further comprising modifying the flag to establish the association on a permanent basis in response to approval by the user.

\* \* \* \* \*